United States Patent Office 3,019,253
Patented Jan. 30, 1962

3,019,253
ACETYL-4-TRIFLUOROMETHYL SALICYLIC ACID
Murray Hauptschein, Glenside, Pa., assignor to Pennsalt Chemicals Corporation, Philadelphia, Pa., a corporation of Pennsylvania
No Drawing. Filed May 15, 1958, Ser. No. 735,642
1 Claim. (Cl. 260—479)

This invention relates to acetyl-4-trifluoromethylsalicylic acid, a novel compound which is useful as an analgetic and fungicide. This application is a continuation-in-part of copending application Serial No. 447,390, filed August 2, 1954, now abandoned.

Acetyl-4-trifluoromethylsalicylic acid is prepared from 4-trifluoromethylsalicylic acid which is disclosed and claimed in said copending application. The following example illustrates the preparation of acetyl-4-trifluoromethylsalicylic acid.

EXAMPLE 1

One and one-half grams of 4-trifluoromethylsalicylic acid were mixed with 5 ml. of acetic anhydride and two drops of concentrated sulfuric acid and maintained at about 20° C. to 30° C. Reaction began at once and proceeded rapidly to completion. Acetyl-4-trifluoromethylsalicylic acid was obtained in almost quantitative yield. Upon recrystallization from a petroleum ether-ethyl ether mixture, the product, which was a mat of fine white needles, melted at 110–112° C. when placed in a bath previously heated to 108° C. It was difficult to get consistent values for the melting point of the sample when heating slowly from room temperature.

*Analysis.*—Calcd. for $C_{10}H_7O_4F_3$: C, 48.40; H, 2.84. Found: C, 48.64; H, 3.00.

Acetyl-4-trifluoromethylsalicylic acid is miscible with ethanol but only very slightly soluble in water. No coloration was obtained with aqueous ferric chloride. However, on standing overnight the solution slowly developed a violet-red color due to hydrolysis of the ester. The ester was hydrolyzed intentionally with 25% sodium hydroxide at 70° C. for six hours, and after acidification the original acid, M.P. 177–178° C., was isolated.

Acetyl-4-trifluoromethylsalicylic acid can also be prepared by using acetyl chloride as the acetylating agent. Also, zinc chloride or sodium acetate can be used as the catalyst in place of the sulfuric acid.

The reaction can be carried out in the temperature range from about 0° C. to about 100° C. A temperature in the range 20° C. to 40° C. is preferred.

The acetylating agent is preferably used in an amount sufficiently in excess of the stoichiometric quantity to serve as the reaction medium. Acetyl-4-trifluoromethylsalicylic acid is recovered by crystallization from the reaction mass and by recrystallization from a petroleum ether-ethyl ether solvent mixture.

The amount of catalyst used in the reaction is about the same as that commonly used in the art for acetylation reactions, ranging from about 0.1% to about 10% by weight of the acetylating agent. An amount of 0.1% to about 5% of catalyst is preferred.

Acetyl-4-trifluoromethylsalicylic acid has the following structure:

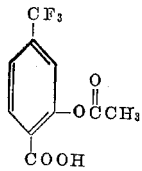

The novel compound of this invention has been found to cause analgesia in animals in much the same manner as aspirin and similar pain-relieving compounds.

The analgetic activity of acetyl-4-trifluoromethylsalicylic acid is demonstrated in the following example.

EXAMPLE 2

Acetyl-4-trifluoromethylsalicylic acid (ATMSA) was administered to rats in oral doses of 100 and 200 mg./kg. of body weight and the results were compared to results obtained with aspirin and codeine. The data and results are shown in Table I.

Table I

| Drug | Dose, mg./kg. per os. | Analgetic Units/Test Units | Percent | Side Effects |
|---|---|---|---|---|
| ATMSA | 100 | 14/60 | 23.2 | No side effects. |
| ATMSA | 200 | 14/60 | 23.2 | Do. |
| Aspirin | 300 | 3/18 | 16.7 | Do. |
| Codeine | 100 | 24/42 | 57 | Quiet, tense. |

From the above data it will be noted that acetyl-4-trifluoromethylsalicylic acid produces analgesia in doses lower than usually seen with common aspirin, acetylsalicylic acid.

Acetyl-4-trifluoromethylsalicylic acid also is useful as a fungicide. Its fungicidal activity is demonstrated in the following example.

EXAMPLE 3

A 5% solution of acetyl-4-trifluoromethylsalicylic acid in polyethylene glycol 200 (m.w.) was prepared and used in control of the growth of *T. Mentagrophytes*. Salicylic acid was used for comparison of the relative activity with a diluent control sample. The data and results are shown in Table II, where +=growth and 0=no growth.

Table II

| Concentration of Compound | Exposure Time | | | |
|---|---|---|---|---|
| | 5 min. | 15 min. | 30 min. | 1 hour |
| 5% Acetyl-4-trifluoromethyl salicylic acid | + | 0 | 0 | 0 |
| 5% Salicylic acid | + | + | 0 | 0 |
| Diluent Control | + | + | + | + |
| Scales Growth Control | + | | | |

From the test results it will be noted that acetyl-4-trifluoromethylsalicylic acid killed the organism within 5 to 15 minutes exposure time, demonstrating definite antifungal activity. It is also shown to be substantially better than salicylic acid in this test.

EXAMPLE 4

A beneficial keratolytic powder for treatment of ringworm of the feet is prepared by mixing together five parts of acetyl-4-trifluoromethylsalicylic acid, two parts of menthol, eight parts of camphor, 50 parts of boric acid and 35 parts of starch.

The above described embodiments of the invention are presented for the purpose of illustration. As many widely different embodiments of this invention can be made without departing from the spirit and scope thereof, it is to be understood that the invention is not intended to be limited by the above-noted specific embodiments.

I claim:
Acetyl-4-trifluoromethylsalicylic acid.

(References on following page)

References Cited in the file of this patent

UNITED STATES PATENTS

| | | |
|---|---|---|
| 2,134,388 | Cherry | Oct. 25, 1938 |
| 2,641,609 | Schock et al. | June 9, 1953 |
| 2,758,054 | Smith | Aug. 7, 1956 |
| 2,841,522 | Wolf | July 1, 1958 |

OTHER REFERENCES

Wagner and' Zook: "Synthetic Organic Chemistry" (1953), pp. 481–482.

Hauptschein et al.: J.A.C.S., vol. 76, pp. 1051–4, Feb. 20, 1954.

Royals: "Advances Organic Chemistry" (1956), page 605.